United States Patent
Batten et al.

(10) Patent No.: US 11,130,084 B2
(45) Date of Patent: Sep. 28, 2021

(54) MULTILAYER ROTOMOLDED GREASE TRAP

(71) Applicant: Thermaco, Incorporated, Asheboro, NC (US)

(72) Inventors: William C. Batten, Asheboro, NC (US); Bruce Kyles, Asheboro, NC (US); Gavin Rumble, Lexington, NC (US); Zachary Michael Rubeor, Greensboro, NC (US); Erwin Hani, Asheboro, NC (US)

(73) Assignee: Thermaco Incorporated, Asheboro, NC (US)

( * ) Notice: Subject to any disclaimer, the term of this patent is extended or adjusted under 35 U.S.C. 154(b) by 0 days.

(21) Appl. No.: 16/778,483

(22) Filed: Jan. 31, 2020

(65) Prior Publication Data

US 2020/0246736 A1     Aug. 6, 2020

Related U.S. Application Data

(60) Provisional application No. 62/799,854, filed on Feb. 1, 2019.

(51) Int. Cl.
| | | |
|---|---|---|
| *E03F 5/16* | (2006.01) | |
| *B01D 35/30* | (2006.01) | |
| *E03F 5/10* | (2006.01) | |
| *B01D 17/02* | (2006.01) | |
| *B65D 90/02* | (2019.01) | |
| *C02F 1/40* | (2006.01) | |

(52) U.S. Cl.
CPC ....... *B01D 35/308* (2013.01); *B01D 17/0214* (2013.01); *B65D 90/022* (2013.01); *E03F 5/10* (2013.01); *E03F 5/16* (2013.01); *C02F 1/40* (2013.01); *C02F 2201/002* (2013.01)

(58) Field of Classification Search
CPC .......... E03F 5/16; C02F 1/40; B01D 17/0211; B01D 17/0214; B65D 88/76; B65D 90/022
USPC ........ 210/521, 532.1, 532.2, 538; 220/62.11, 220/62.22
See application file for complete search history.

(56) References Cited

U.S. PATENT DOCUMENTS

| | | | |
|---|---|---|---|
| 3,904,524 A * | 9/1975 | Pelton ................ | B01D 17/0214 210/532.2 |
| 7,367,459 B2 | 5/2008 | Batten et al. | |
| 7,540,967 B2 | 6/2009 | Batten et al. | |
| (Continued) | | | |

FOREIGN PATENT DOCUMENTS

| | | | |
|---|---|---|---|
| WO | WO 2019/089686 | * | 5/2019 |
| WO | WO 2019/089686 A1 | | 5/2019 |
| WO | WO 2020 076593 A1 | | 4/2020 |

OTHER PUBLICATIONS

"Double Wall Foam Cross-Section for Constant Weight . . . " admitted prior art.

*Primary Examiner* — Christopher Upton
(74) *Attorney, Agent, or Firm* — MacCord Mason PLLC

(57) ABSTRACT

A grease trap or solids collector for separating waste from waste water has a tank having a multilayer outer wall made of an outer layer of un-foamed plastic, an intermediate layer of foamed plastic, and an inner layer of unfoamed plastic; an inlet invert in the tank for receiving incoming waste water; and an outlet invert for removing water from the tank. An extension collar made up of segments can be included.

18 Claims, 6 Drawing Sheets

(56) References Cited

U.S. PATENT DOCUMENTS

| | | | |
|---|---|---|---|
| 7,641,805 B2 | 1/2010 | Batten et al. | |
| 8,002,139 B1 | 8/2011 | Batten et al. | |
| 8,151,999 B1* | 4/2012 | Moore, Jr. | E03F 11/00 |
| | | | 210/532.2 |
| 9,528,258 B1 | 12/2016 | McBride et al. | E03F 5/16 |
| 9,932,247 B1 | 4/2018 | Batten et al. | C02F 1/40 |
| 2005/0178721 A1* | 8/2005 | Lombardi, II | B65D 88/76 |
| | | | 210/532.2 |
| 2006/0076300 A1* | 4/2006 | Mitchell | E03F 5/16 |
| | | | 210/538 |
| 2007/0251879 A1 | 11/2007 | Batten et al. | 210/532.1 |
| 2020/0109067 A1* | 4/2020 | Gonzalez | C02F 1/40 |

* cited by examiner

MULTILAYER ROTOMOLDED GREASE TRAP

Historically, grease traps have been used in restaurants and other commercial facilities to limit the amount of fats, oils and grease (referred to as FOG) and solid waste that is carried into sewer systems via waste water. Typical grease traps are either passive grease traps or automatic grease traps. Passive grease traps are usually only emptied of the waste periodically and therefore waste tends to build up inside the tank. Passive grease traps typically include a tank with an inlet that brings in waste water and an outlet that carries water out of the system. Lightweight grease rises to the top of the tank and heavier solids settle in the bottom of the tank.

Conventional rotomolded passive grease traps are a single ply construction, typically 0.23" (0.59 cm) thick. When installed below ground, these traps generally are reinforced with a surrounding concrete pour, as described in U.S. Pat. No. 9,528,258 entitled Manhole Ring Support For Unified Concrete Pours Around Grease Trap. This added step of adding a concrete pour adds to the expense and delay of installations.

Moreover, for installations above ground, once the grease trap is loaded with grey water and/or F.O.G., as is the intended use, care must be taken to avoid outward bulging of sidewalls of the trap that could weaken the trap or cause other complications.

SUMMARY OF THE INVENTION

The present invention fulfills one or more of these needs in the art by providing a grease trap for separating waste from waste water including a tank having a multilayer outer wall comprising an outer layer of un-foamed plastic, an intermediate layer of foamed plastic, and an inner layer of un-foamed plastic. An inlet invert in the tank receives incoming waste water, and an outlet invert removes water from the tank. The tank and its layers are typically rotomolded plastic.

The tank preferably has at least one divider dividing the tank into an upper chamber and a lower chamber and having a hole in the divider for allowing FOG into the upper chamber. The outlet invert has a receiving end below the divider. The divider may be separate piece that is mounted in the tank. Channels in peripheral walls of the divider may help define or position the inlet invert and outlet invert. The divider can be provided as a bottom of an insert tank that nests within the tank having a multilayer outer wall.

Preferably, the outer layer, intermediate layer, and inner layer of the multilayer outer wall of the tank are all polyethylene. The outer layer may be at least about 0.10 inch (0.26 cm) thick and the inner layer is at least about 0.050 inch (0.13 cm) thick. The outer layer may have a density of about 60 pounds (27.21 kg) per cubic foot ((0.028 cubic meter) and the intermediate layer may have a density of about 15 pounds (6.8 kg) per cubic foot (0.028 cubic meter). Overall, the multilayer outer wall of the tank is typically less than 0.5f inch (1.27 cm) thick, and in one embodiment is about 0.463 inch (1.18 cm) thick.

The invention can also be considered as a solids collector for collecting solids in waste water that are heavier than water including a tank having a multilayer outer wall comprising an outer layer of un-foamed plastic, an intermediate layer of foamed plastic, and an inner layer of un-foamed plastic. An inlet invert in the tank receives incoming waste water; and an outlet invert enables removal of water from the tank. The tank acts as a solids collector for collecting solids in waste water that are heavier than water. The outer wall has a bottom downwardly sloping from a tank perimeter to a central location, the inlet invert opens above the bottom so that solids in the waste water gravitationally separate towards the bottom as waste water with reduced solids discharges from the container through the outlet invert.

The invention can also be considered as a method of making a grease trap including rotomolding an outer tank including molding a first un-foamed layer, molding a foamed layer inside and in contact the first un-foamed layer, and molding a second un-foamed layer inside and in contact with the foamed layer, and mounting an inlet invert and an outlet invert in the outer tank. Molding can include forming a tank bottom that slopes downwardly from a tank perimeter to a central location.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
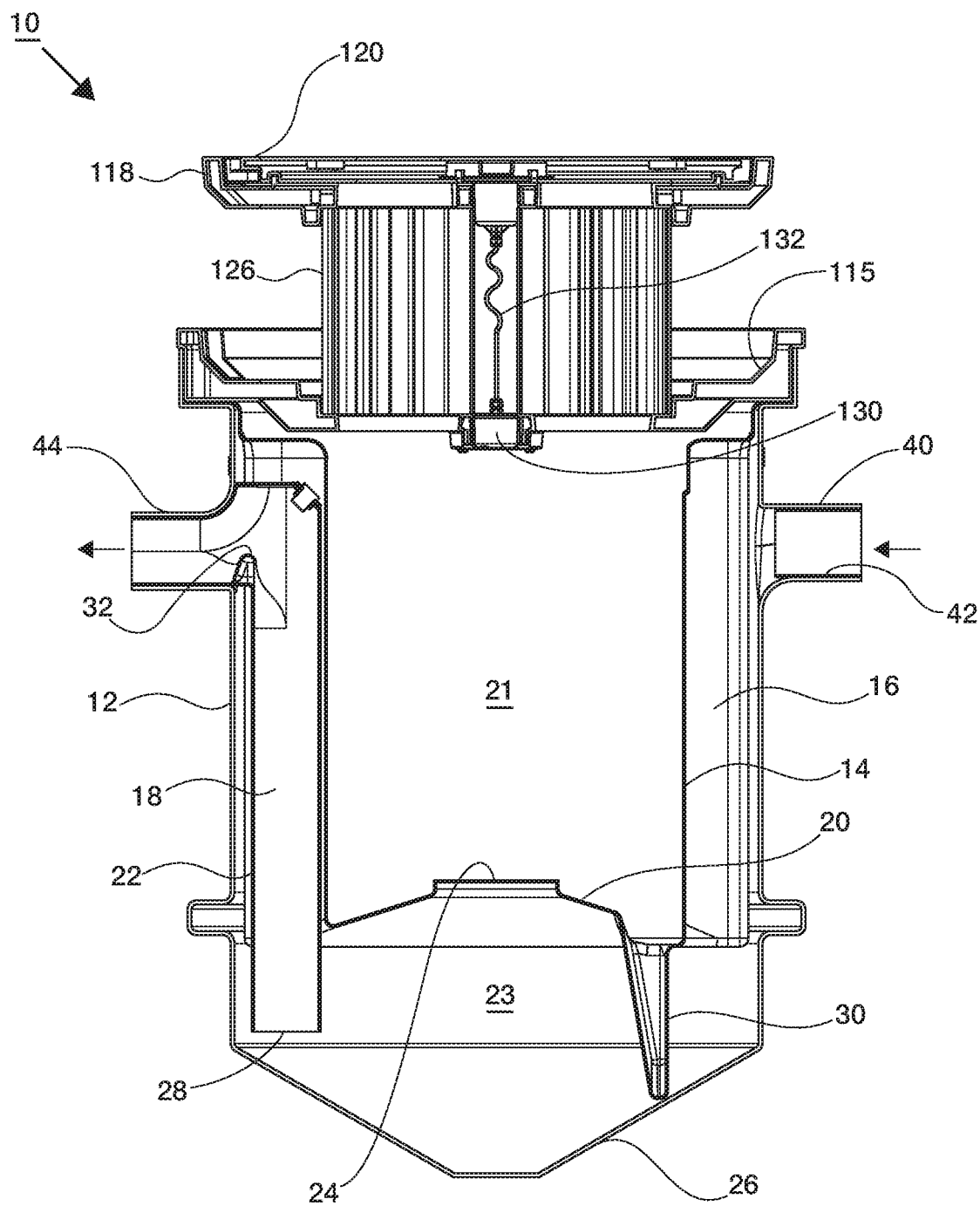
FIG. 1 shows a sectional view through the middle of a grease trap including the middle of inlet and outlet channels.

The grease trap 10 shown in FIG. 1 has an outer tank 12, including an inlet fitting 40 and an outlet fitting 44. An insert tank 14 snugly fits into the outer tank 12 but has channels that define an inlet flow path 16 for incoming effluent and an outlet flow path 18 for grey water that is allowed to pass to sewer lines. A baffle 30 may be included on the bottom of the insert tank 14 to direct incoming effluent low in the tank 12.

The insert tank 14 has a divider 20 dividing the volume within the outer tank into an upper chamber 21 and a lower chamber 23. A hole 24 in the divider 20 allows FOG to rise into the upper chamber 21 from the lower chamber 23. The insert can provide multiple levels of dividers, such as those disclosed in International patent application no. PCT/US2019/054390.

A tube 22 or outlet invert extends the outlet flow path 18 downward so that flow path begins as the entrance 28 to the tube 22 below the divider 20, which helps assure that only grey water quite free of FOG exits the outlet 44. The outlet invert, inlet invert and divider may include separate pieces that are mounted in the tank 12. The tank 12 has a bottom that slopes downwardly from the perimeter to a central location.

FIG. 1 also shows an extension collar that can be used to enable the grease trap 10 to be buried at an appropriate depth for sewer fittings and yet have an access from ground level. The extension collar 126 rests on an intermediate lid 115 on the tank 12. An upper lid 118 is at ground level, supported by the collar 126 (and fill that surrounds the collar) and a ground level lid 120 nests in the upper lid 118. A level sensor 130 at the intermediate lid 115 is tied to the upper lid 118 by a tether 132. The level sensor 130 can be a level sensor as disclosed in international patent application number WO 2019/089686 A1. The sensor can be used to monitor the build-up of FOG in the trap 10.

Figure 2:
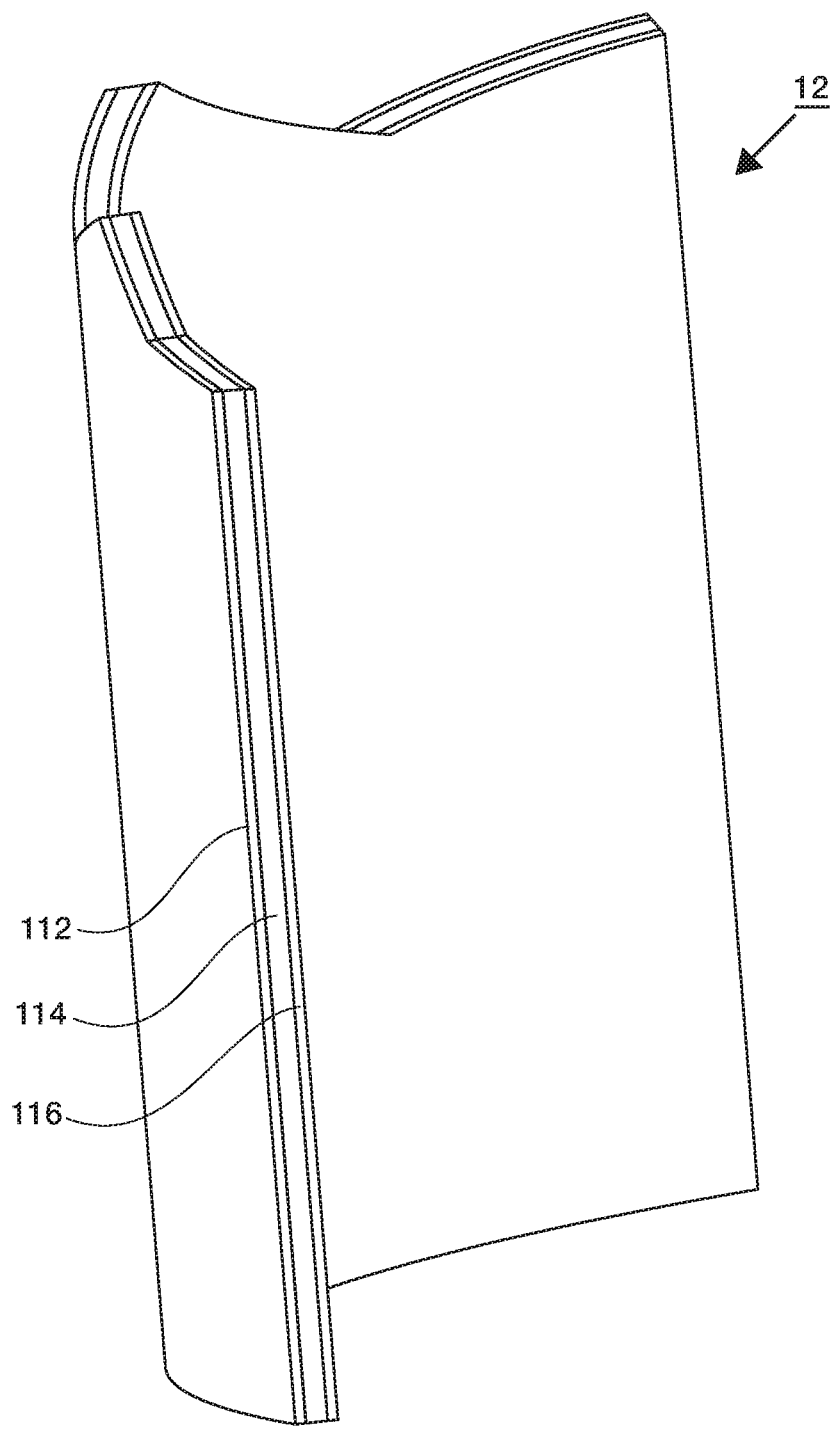
FIG. 2 is perspective view of grease trap multilayer outer wall, partially broken away to show the layers.

FIG. 2 shows a perspective view of the grease trap's multilayer outer wall, broken away to show the layers, including an outer layer 112 of un-foamed plastic, an intermediate layer 114 of foamed plastic, and an inner layer 116 of un-foamed plastic. The outer and inner layers of un-foamed plastic are preferably polyethylene, more preferably high-density polyethylene, and most preferably with a density of 60 pounds (27.21 kg) per cubic foot (0.028 cubic meter). The foamed intermediate layer is also preferably polyethylene, and preferably has a density of 15 pounds (6.8 kg) per cubic foot (0.028 cubic meter). Overall, the multilayer outer wall of the tank is typically less than 0.5 inch (1.27 cm) thick, and in one embodiment is about 0.463 inch (1.18 cm) thick.

The outer layer is preferably at least about 0.10 inch (0.26 cm) thick, and the inner un-foamed layer is preferably not less than about 0.050 inch (0.13 cm) thick.

The three-ply construction of the tank wall gives deflection strength in both inward and outward bending situations. Thus, when buried, the tank need not be reinforced with a concrete pour to assure that inward deflection does not occur. When not buried, the tank wall has sufficient strength to prevent outward deflections, even when filled with grey water.

The skin-foam-skin for the tank wall can be used in a wide variety of grease traps and/or solids collectors, and in particular in traps constructed and/or operated as disclosed in the patent publications listed below, the disclosures of which are incorporated herein by reference to the extent permitted by 37 CFR 1.57(g):

| Title | Publication Number | Publication Date |
|---|---|---|
| Passive Grease Trap Using Separator Technology | U.S. Pat. No. 9,932,247 | 3 Apr. 2018 |
| Passive Grease Trap Using Separator Technology | U.S. Pat. No. 7,367,459 | 6 May 2008 |
| Passive Grease Trap With Pre-Stage For Solids Separation | U.S. Pat. No. 7,641,805 | 5 Jan. 2010 |
| Passive Grease Trap Using Separator Technology | U.S. Pat. No. 7,540,967 | 2 Jun. 2009 |
| Non-Contact Sensor For Determining A F.O.G. Level In A Separator | WO 2019/089686 A1 | 9 May 2019 |

Figure 3:
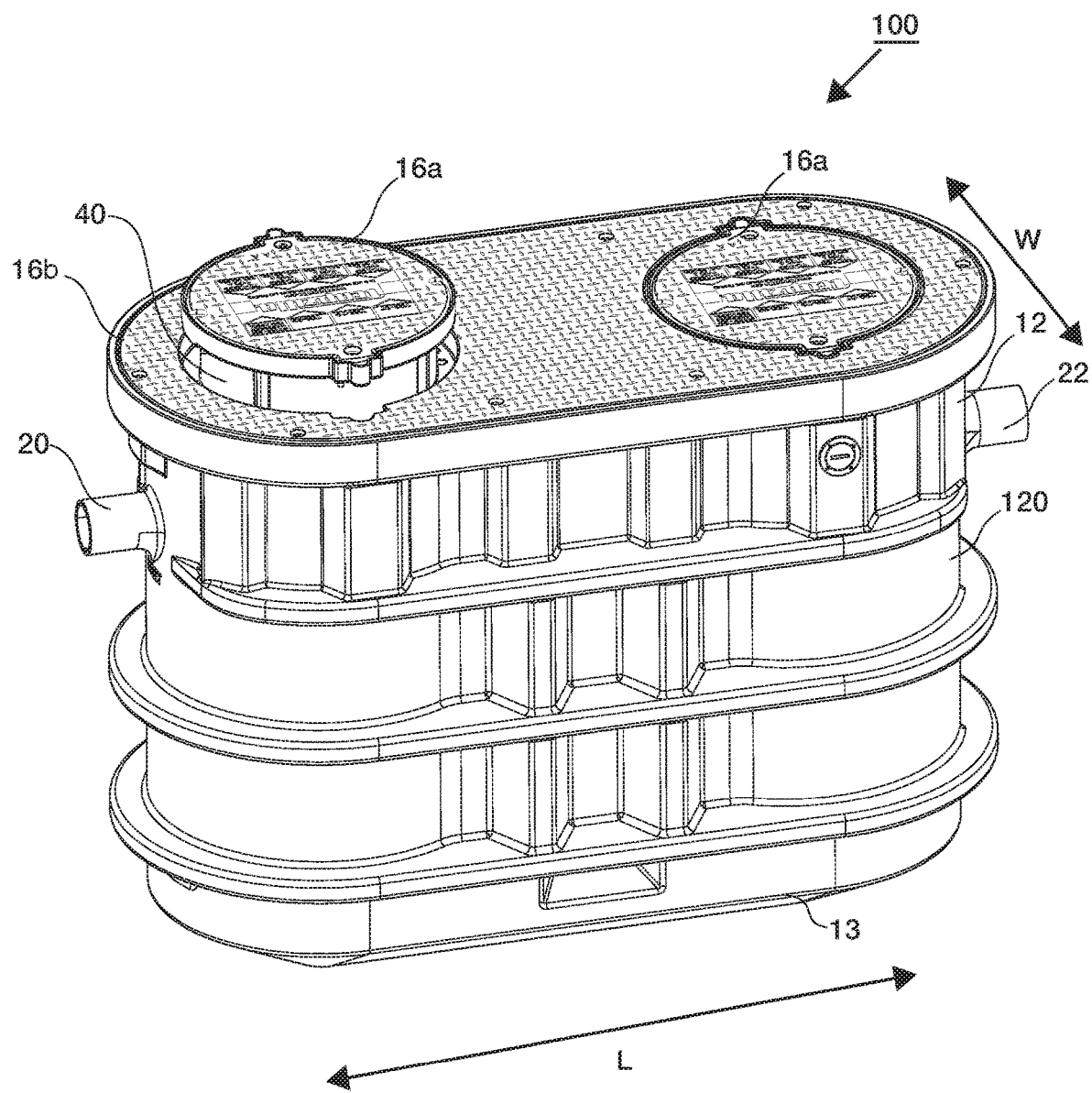
FIG. 3 shows a side view of a grease trap tank with a more complex shape in accordance with another embodiment.

An example of a more complex shape for the grease trap tank with a skin-foam-skin for the tank wall can be seen in FIG. 3. FIG. 3 shows the grease trap 100 may include an increased capacity tank 120 with two round ends connected by a relatively straight middle. The increased capacity tank 120 allows for increased storage of grease, thus increasing the time between needed grease extractions. In one example, the tank 120 may have a length L between the inlet invert and the outlet invert and a width W, where the length L is greater than the width W. Interior elements of grease trap 100 can be configured to function similarly to those of the embodiment of FIG. 1.

The tank 120 can have a bottom 13 that slopes downwardly from a perimeter to a central location. The has an inlet fitting 22 and an outlet fitting 20. The upper part 16b of the tank receives an intermediate lid, and the extension collar 30 supports a ground level lid 160. FIG. 3 shows a tank that has two ground level lids 16a at different heights, but that would likely not occur in typical installations; the right side of FIG. 3 illustrates how the lid 16a can be installed when the extension collar is not needed (such as for above-ground installations), while the left side shows the mounting on an extension collar for a buried installation.

Plastic pipe connections to the grease trap inlet and outlet can be made using the methodology and apparatus disclosed in U.S. Pat. No. 8,002,139 entitled "Method Of Joining A Plastic Tube To Another Tube," the disclosure of which is incorporated herein by reference. For example, a connection to source of effluent such as a kitchen dishwasher or sink can terminate as a pipe end 42 (as seen in FIG. 1) that is inserted in the inlet fitting 40 and secured to fitting 40 using the methodology and apparatus disclosed in U.S. Pat. No. 8,002,139.

Rotational molding has been used to make molded laminated structures for a number of years. A typical rotational molding apparatus for making a molded laminated structure includes a mold assembly having means to rotate about two axes, an oven into which the mold assembly can travel and in which it can "rock and roll" about the two axes. The apparatus may have one or two insulated boxes positioned to release particulate plastics into the mold cavity while it rocks and rolls in the oven.

The molding method carried out with this apparatus may include the following steps: First, the insulated boxes are filled with the appropriate plastic particulates, chosen to provide the desirable laminate qualities. For example, one of the boxes could be filled with the appropriate charge of a plastic with a blowing agent, while the other could have a plastic without a blowing agent. Then, another charge of plastic particulate material is placed loosely in the mold cavity, which is then closed.

The mold assembly is moved into the oven and the rocking and rolling action begins. The oven heats the mold assembly and mold, eventually causing the mold cavity wall to reach a temperature causing melting of the particulates sliding thereacross to start forming a layer in contact with the cavity wall. This layer thickens as the rotational movement continues.

Subsequently, one of the insulated boxes is opened to release the particulate plastic and blowing agent. Melting of the new material begins as it contacts the hot outer layer, and the new material forms as a second layer intimately bonded to the first layer. The second layer becomes a foam layer by virtue of the action of the blowing agent.

After substantial completion of the formation of the foam layer, the other insulated box is opened to release the remaining charge of particulate plastic. This material begins to melt by virtue of the heat of the foam layer and intimately bonds with the foam layer and forms an inside layer.

After the inside layer forms, the mold assembly is removed from the oven and cooling begins. Cooling may be carried out by use of fans blowing on the mold assembly, which may continue its rotational movement to allow the fanned air to contact the outer surfaces of the mold relatively evenly. During cooling, while the molded piece remains in the mold, the mold cavity may or may not be opened by opening doors exposing the mold cavity to the cooling air.

After cooling, the molding piece is stripped from the mold, and the process can begin again.

Figure 4:
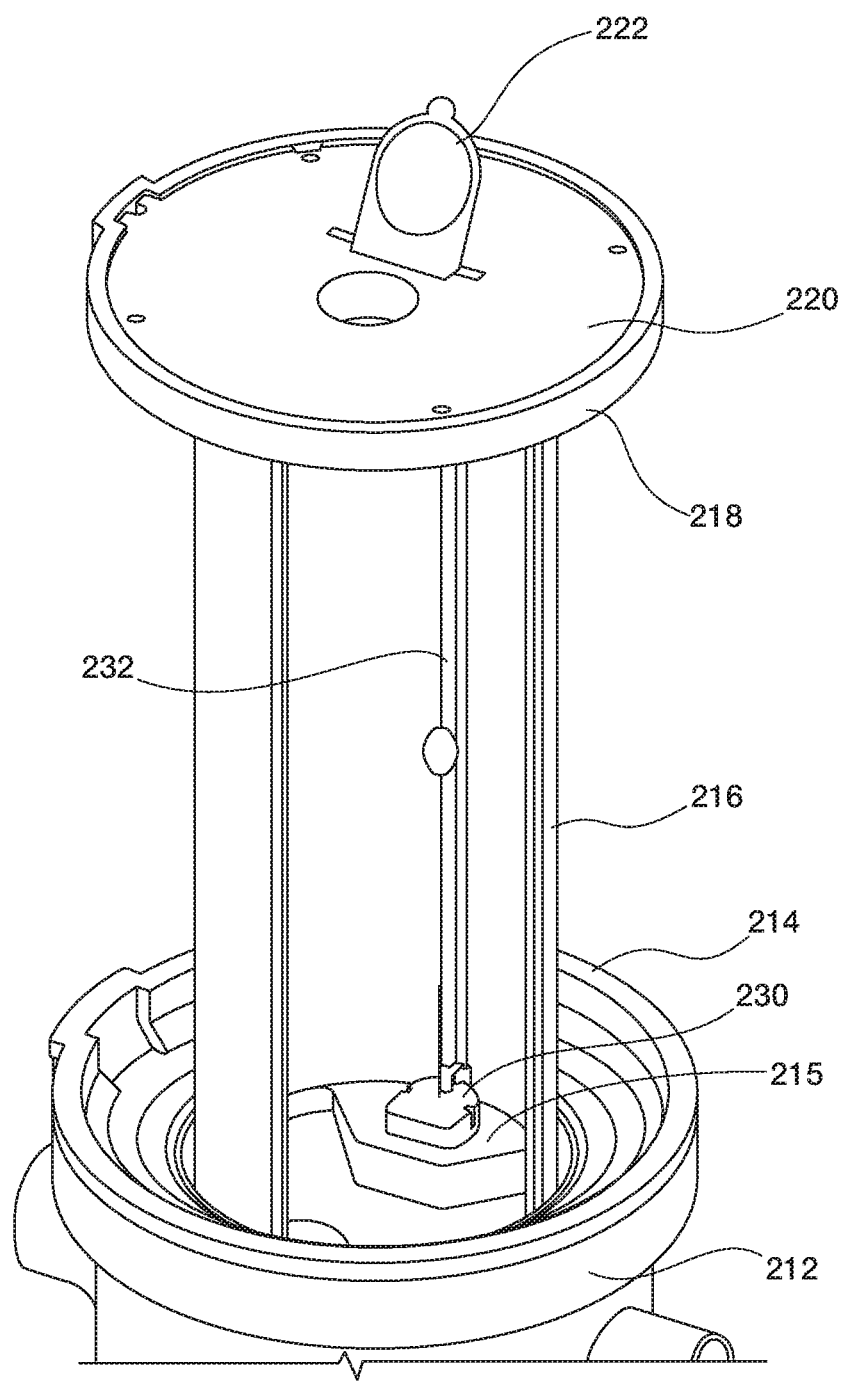
FIG. 4 is perspective view a top of a grease trap showing an alternate extension collar embodiment, partially unassembled.
Figure 5:
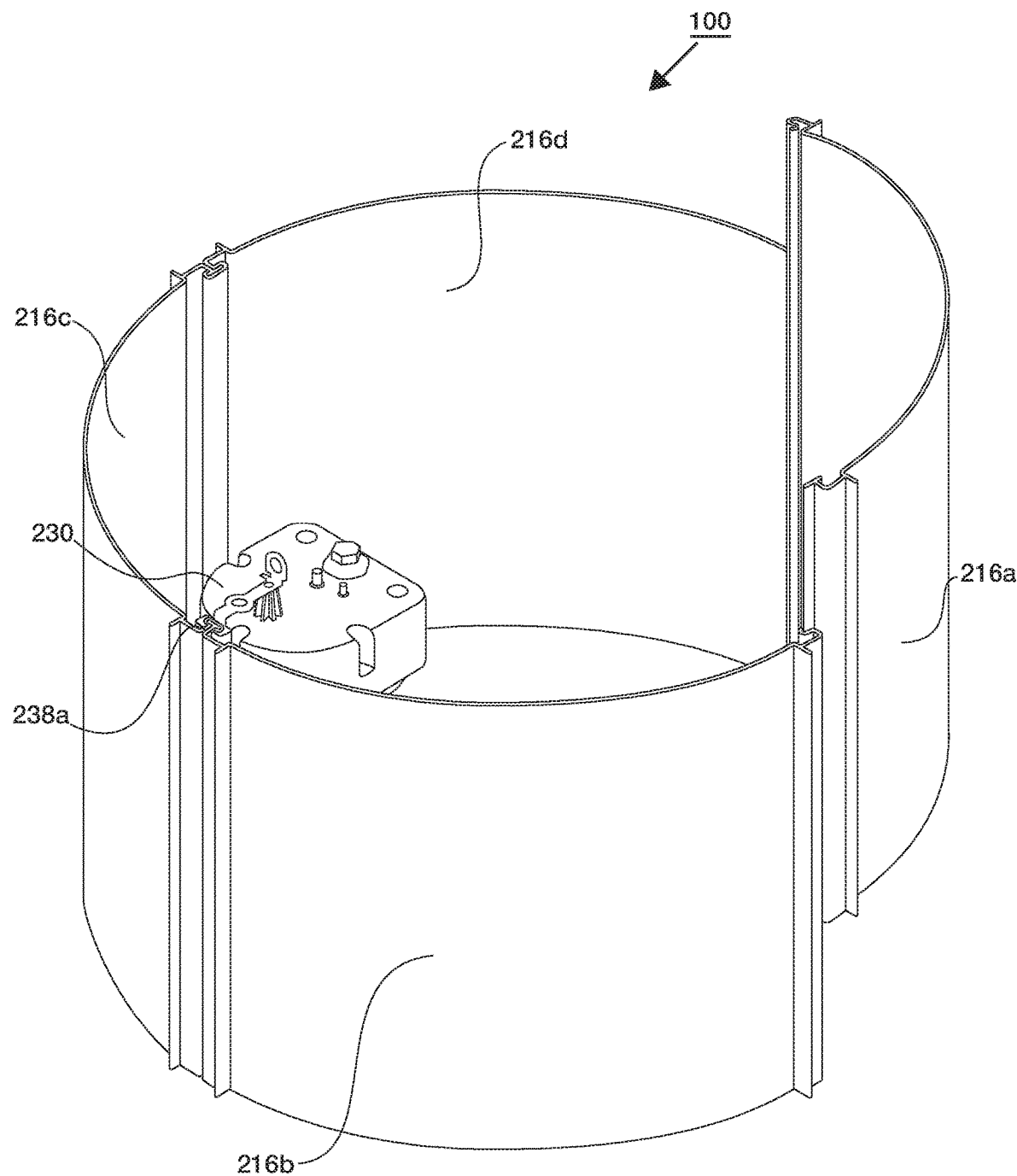
FIG. 5 is an enlarged perspective view showing the arcs of the extension collar of FIG. 4.
Figure 6:
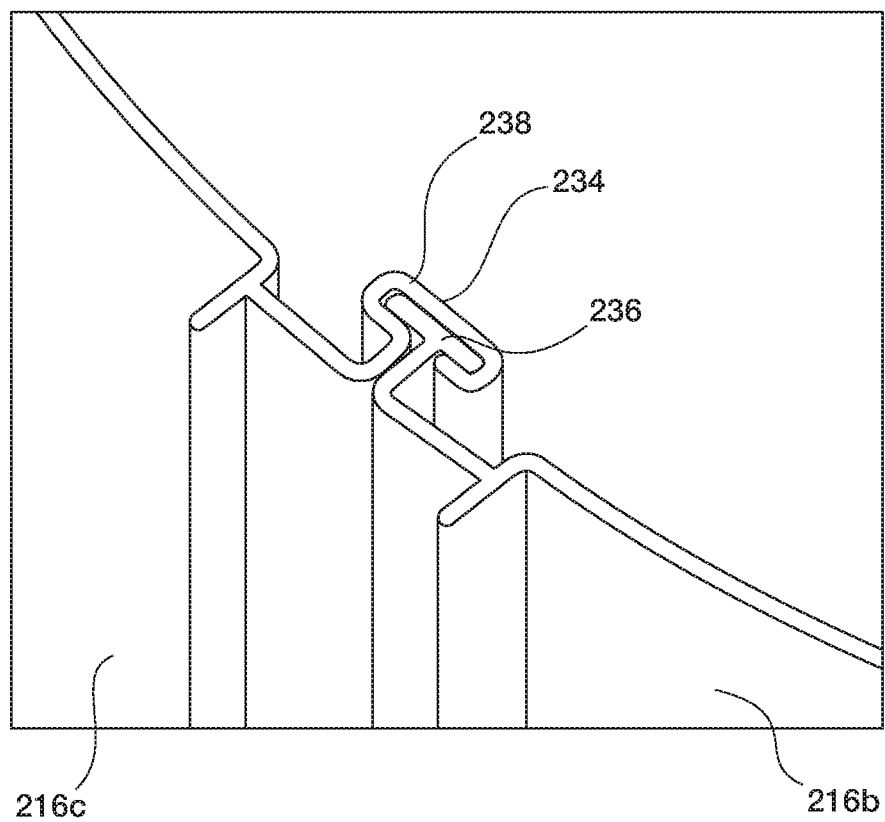
FIG. 6 is a further enlarged, partial perspective view of the extension collar of FIG. 4.

FIGS. 4 through 6 show another embodiment and show another embodiment of an extension collar. In FIG. 4 one of four collar segments (discussed below) has be omitted to illustrate the interior of the collar, but that fourth segment would be in place in use. The intermediate lid 214 supports the collar 216 which in turn supports the upper lid 218 and its ground level cover 220. A pivoting hatch 222 in the cover 220 can be used to allow the insertion of a suction tube when the grease trap needs to be pumped. The intermediate lid 214 includes an inner shelf 215 that is formed with a pocket to nest the look down sensor 230. In this embodiment, the look down sensor is suspended by a tether 232 from the underside of the lid 220.

FIG. 5 shows that the extension collar 216 can be made up of a plurality of curved collar segments 216*a*, 216*b*, 216*c*, and 216*d*. The segments are identical and are configured so that they assemble into a cylindrical collar. As can be seen in FIG. 6 each of the segments has one end that is a male protrusion 236, while the other end has a female protrusion 234. The male protrusion of each segment can be slid axially into the female protrusion of an adjacent segment to make a full cylinder. The male/female engagement prevent the segments from being pulled apart laterally. While the embodiment shown in the figures has four segments, other multiples can be used. When the collar segments are unassembled, they can be stacked together for storage and shipment for assembly at a job site. The segments can be provided in a standard length and shortened at the job site as needed to adjust the collar length to extend up from the intermediate lid 114 to position the lid 118 and cover 120 at a desired level (typically the ground surface).

As can be seen in FIG. 6, the male and female protrusions together form a rail 238 that extends vertically on the inside face of the collar 216. The look down sensor 230 can be provided with a channel component 238*a* that is sized and configured to fit around and slide on the rail 238. The channel 238*a* slides on the rail 238 as the look down sensor 230 is being raised or lowered by the tether 232. This mounting arrangement allows the sensor 230 to be raised so that it can be periodically serviced, such as by replacing batteries. The tether 132 or 232 can include a data communication cable to enable FOG height data to be available for local reading or transmission. This sensor enables the height of the FOG layer floating on top of the gray water in tank 12 or 212 to be monitored. When the FOG thickness is great enough, the grease trap can be pumped to remove the FOG, collected solid matter and water in the tank.

Certain modifications and improvements will occur to those skilled in the art upon reading the foregoing description. It should be understood that all such modifications and improvements have been omitted for the sake of conciseness and readability but are properly within the scope of the following claims.

What is claimed is:

1. A grease trap for separating waste from waste water comprising
a tank having a top and a bottom that are spaced apart from each other by a multilayer outer wall, the multilayer outer wall comprising an outer layer of un-foamed plastic, an intermediate layer of foamed plastic, and an inner layer of un-foamed plastic and having a circumference, at least a portion of the circumference of the outer wall in the form of an arc of at least 90 degrees that is free of corrugations that extend in a direction between the top and the bottom of the tank;
an inlet invert in the tank for receiving incoming waste water; and
an outlet invert for removing water from the tank.

2. A grease trap as claimed in claim 1 wherein the multilayer outer wall of the tank is roto-molded plastic.

3. A grease trap as claimed in claim 1 wherein the tank has a divider that divides the tank into an upper chamber and a lower chamber and that has a hole for allowing FOG into the upper chamber from the lower chamber.

4. A grease trap as claimed in claim 3 wherein the outlet invert has a receiving end below the divider.

5. A grease trap as claimed in claim 3 wherein the outlet invert, inlet invert and divider include separate pieces that are mounted in the tank.

6. A grease trap as claimed in claim 5 wherein the divider is a bottom of an insert tank that nests within the tank having a multilayer outer wall.

7. A grease trap as claimed in claim 1 wherein the outer layer, intermediate layer, and inner layer of the multilayer outer wall of the tank are all polyethylene.

8. A grease trap as claimed in claim 7 wherein the outer layer is at least about 0.10 inch (0.26 cm) thick and the inner layer is at least about 0.050 inch (0.13 cm) thick.

9. A grease trap as claimed in claim 7 wherein the outer layer has a density of about 60 pounds (27.21 kg) per cubic foot (0.028 cubic meter) and the intermediate layer has a density of about 15 pounds (6.8 kg) per cubic foot (0.028 cubic meter).

10. A grease trap as claimed in claim 1 wherein the multilayer outer wall of the tank is less than 0.5 inch (1.27 cm) thick.

11. A grease trap as claimed in claim 1 wherein the multilayer outer wall of the tank is about 0.463 inch (1.18 cm) thick.

12. A grease trap as claimed in claim 1 wherein the tank has a top, with an intermediate lid for the top, an extension collar configured to be supported on the intermediate lid, an upper lid and ground level lid on the extension collar, the extension collar being configured as a plurality of curved segments that fit together to make a collar.

13. A grease trap as claimed in claim 12 wherein the curved segments fit together by sliding a male segment end of each curved segment along a female segment end of an adjacent curved segment.

14. A grease trap for separating waste from waste water comprising
a tank having a multilayer outer wall comprising an outer layer of un-foamed plastic, an intermediate layer of foamed plastic, and an inner layer of un-foamed plastic;
an inlet invert in the tank for receiving incoming waste water; and
an outlet invert for removing water from the tank;
wherein the tank has a top, an intermediate lid for the top, an extension collar configured to be supported on the intermediate lid, an upper lid and ground level lid on the extension collar,
the extension collar being configured as a plurality of curved segments that fit together to make a collar, wherein the curved segments fit together by sliding a male segment end of each curved segment along a female segment end of an adjacent curved segment; and
wherein male segment ends and female segment ends that have been fit together form a rail and further comprising a sensor having a channel that can be positioned along the rail.

15. A grease trap for separating waste from waste water comprising
a tank having a rotomolded multilayer outer wall comprising an outer layer of un-foamed polyethylene that is at least about 0.10 inch (0.26 cm) thick and has a density of about 60 pounds (27.21 kg) per cubic foot (0.028 cubic meter), an intermediate layer of foamed polyethylene that has a density of about 15 pounds (6.8 kg) per cubic foot (0.028 cubic meter), and an inner layer of un-foamed polyethylene that is at least about 0.050 inch (0.13 cm) thick and has a density of about 60 pounds (27.21 kg) per cubic foot (0.028 cubic meter) and wherein the multilayer outer wall of the tank is less than about 0.5 inch (1.27 cm) thick; the tank outer wall having a circumference, at least a portion of the circumference of the outer wall in the form of an arc of at least 90 degrees that is free of corrugations that extend in a direction between the top and the bottom of the tank;

an inlet invert in the tank for receiving incoming waste water;

a divider dividing the tank into an upper chamber and a lower chamber and having a hole in the divider for allowing FOG into the upper chamber from the lower chamber; and an outlet invert having a receiving end below the divider for removing water from the tank, wherein the outlet invert, inlet invert and divider are separate pieces that are mounted in the tank and the divider is a bottom of an insert tank that nests within the tank having a multilayer outer wall.

16. A grease trap for separating solids from waste water comprising a tank having a multilayer outer wall comprising an outer layer of un-foamed plastic, an intermediate layer of foamed plastic, and an inner layer of un-foamed plastic; the tank outer wall having a circumference, at least a portion of the circumference of the outer wall in the form of an arc of at least 90 degrees that is free of corrugations that extend in a direction between the top and the bottom of the tank;

an inlet invert in the tank for receiving incoming waste water; and an outlet invert for removing water from the tank;

the tank also acting as a solids collector for collecting solids in waste water that are heavier than water, the outer wall having a bottom downwardly sloping from a perimeter to a central location, the inlet invert opening above the bottom so that solids in the waste water gravitationally separate towards the bottom as waste water with reduced solids discharges from the container through the outlet invert.

17. A method of making a grease trap or solids collector comprising rotomolding an outer tank including molding a first unfoamed layer, molding a foamed layer inside and in contact the first unfoamed layer, and molding a second unfoamed layer inside and in contact with the foamed layer, including molding the outer tank to have a circumference, at least a portion of the circumference of the outer wall in the form of an arc of at least 90 degrees that is free of corrugations that extend in a direction between the top and the bottom of the tank;

placing an inlet invert and an outlet invert in the outer tank.

18. A method as claimed in claim 17 wherein molding includes forming a tank bottom that slopes downwardly from a tank perimeter to a central location.

* * * * *